United States Patent [19]

Brinkert

[11] 4,175,645
[45] Nov. 27, 1979

[54] ELECTRICALLY RESETTABLE RAILWAY BRAKE

[75] Inventor: Franz Brinkert, Duisburg, Fed. Rep. of Germany

[73] Assignee: Raco-Elektro-Maschinen GmbH, Schwelm, Fed. Rep. of Germany

[21] Appl. No.: 884,158

[22] Filed: Mar. 7, 1978

[30] Foreign Application Priority Data

Mar. 11, 1977 [DE] Fed. Rep. of Germany ....... 2710585

[51] Int. Cl.$^2$ ............................................ F16D 65/22
[52] U.S. Cl. .................................. 188/72.1; 188/71.9; 188/72.9; 188/173; 188/196 BA; 192/2; 192/90
[58] Field of Search ...................... 188/71.9, 72.9, 171, 188/162, 163, 72.1, 196 BA, 202, 173; 92/90, 89 A, 2

[56] References Cited

U.S. PATENT DOCUMENTS

| | | | |
|---|---|---|---|
| 1,159,238 | 11/1915 | Leonard | 188/171 |
| 1,348,106 | 7/1920 | Halsey | 188/173 |
| 1,972,659 | 9/1934 | Kopay | 188/162 |
| 2,070,365 | 2/1937 | Leventis et al. | 188/162 |
| 2,283,966 | 5/1942 | Brown | 188/202 |
| 2,512,565 | 6/1950 | Hallander | 188/171 |
| 2,877,871 | 3/1959 | Tack | 188/59 |
| 3,219,155 | 11/1965 | Kohli | 188/162 X |
| 3,779,100 | 12/1973 | Schmidt | 74/665 X |
| 3,964,579 | 6/1976 | Harrison | 188/71.9 |
| 4,006,801 | 2/1977 | Bayliss | 188/162 X |
| 4,066,152 | 1/1978 | Pascal | 188/171 |

Primary Examiner—George E. A. Halvosa
Attorney, Agent, or Firm—Montague & Ross

[57] ABSTRACT

A brake for a railway vehicle has a transmission whose input is connected to a drive motor and whose rotary output is connected through a free-running stepdown transmission to an eccentric that rotates about an axis perpendicular to the direction of displacement of a follower operatively radially engaged with this eccentric. A pack of springs is braced between an abutment spaced to fix distance from the rotation axis of the eccentric and the follower so that this eccentric can load these springs. One arm of a caliper is connected to the follower and the other end thereof carries a brake pad engageable with a brake disk carried on a wheel. The springs are at maximum compression when the brake is off and vice versa so that if power fails the springs will automatically close the caliper on the brake disk and stop the vehicle.

24 Claims, 15 Drawing Figures

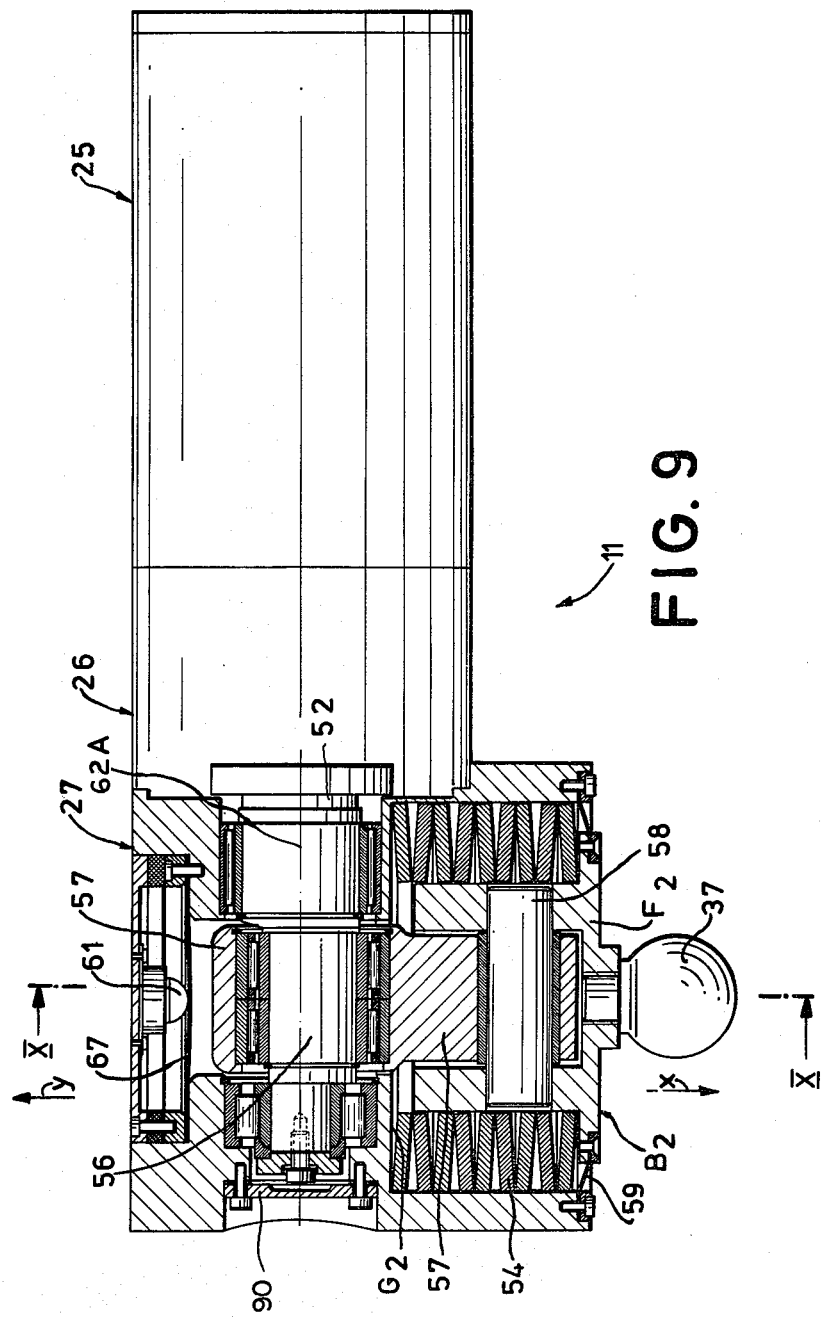

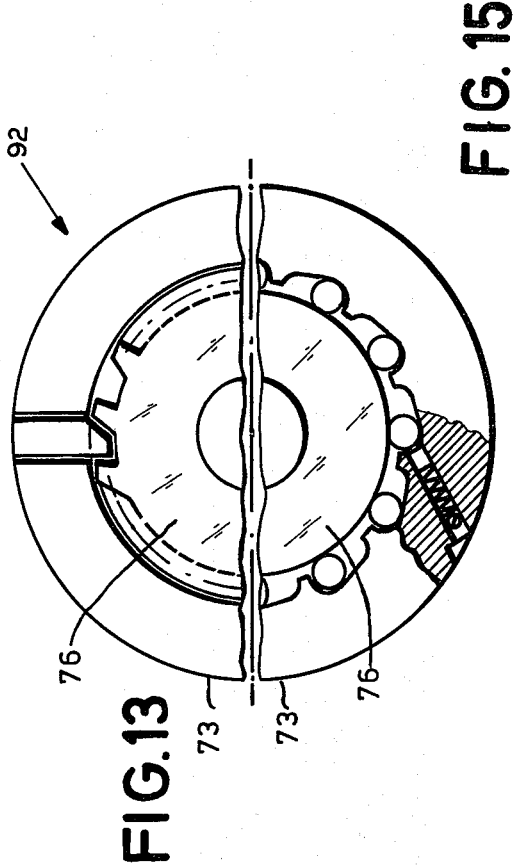
FIG.12
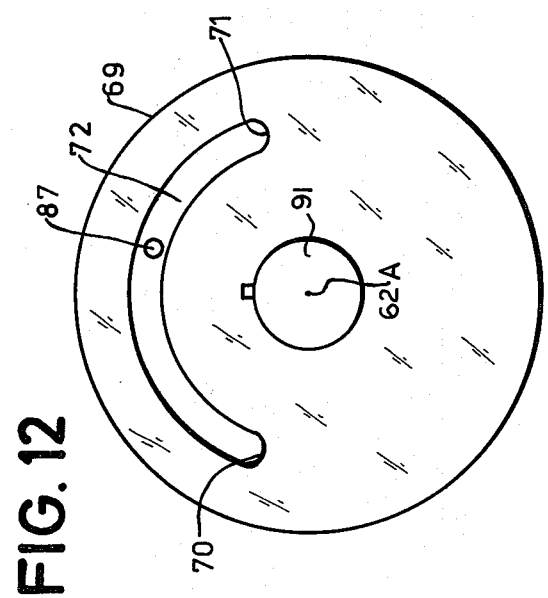
FIG.13
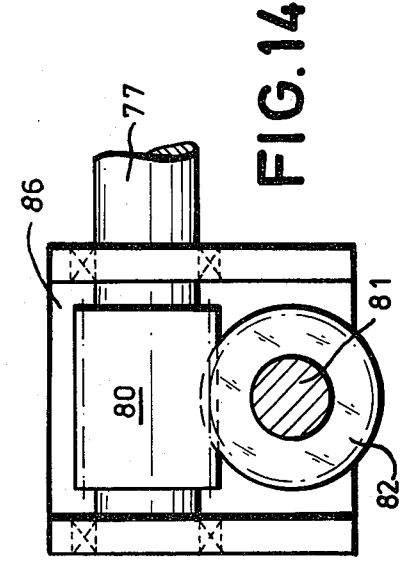
FIG.14
FIG.15

ELECTRICALLY RESETTABLE RAILWAY BRAKE

FIELD OF THE INVENTION

The present invention relates to a brake for a vehicle. More particularly this invention concerns an electrically resettable brake for a railway car wherein the brake is automatically actuated in the event of a cutoff of electric power to the brake.

BACKGROUND OF THE INVENTION

A railway vehicle is usually provided with a brake which automatically closes if the electric power to the vehicle is cut off or fails. Thus the electric motor of such a brake normally serves not to drive the brakeshoe or shoes against the braking member of the vehicle, but instead serves to pull such brakeshoes away from the braking element, with a spring or pack of springs normally wedging the brakeshoes into engagement with the brake element, normally a disk.

With such a brake the drive motor is usually an electric motor having a rotary motor output connected to a travelling-ball transmission whose output member is connected on one side to the operation member of a spring pack and on its other side is connected to a lever arrangement that operates in turn on a coupling element displaceable transversely to the longitudinal axis of the rotary drive. This coupling element is connected to one arm of a caliper which is linked to the other caliper arm so that when displaced in one direction the two caliper arms will grip the brake disk and slow or stop the vehicle.

Such an arrangement can be used both as the service brake of a railway vehicle or as an emergency brake. This type of electrically resettable brake is normally relatively bulky and quite complex. It requires frequent servicing and often responds relatively slowly, particularly after some wear.

OBJECTS OF THE INVENTION

It is therefore an object of the instant invention to provide an improved brake.

A further object is the provision of an improved electrically resettable railway brake which overcomes the above-given disadvantages.

Yet another object of this invention is to provide a brake of the above-described general type which is extremely compact and which responds rapidly.

SUMMARY OF THE INVENTION

These objects are attained according to the present invention in a brake of the above-described general type wherein a rotary motor output is connected to a transmission having a relatively high transmission ratio such that its input rotates at a speed many times greater than its output. An eccentric is mounted on the transmission output for rotation about the axis thereof and is radially engaged by a follower which can therefore be radially displaced in a predetermined radial direction on rotation of the eccentric about its axis. A spring or spring pack is braced between an abutment spaced to a fixed distance in this predetermined direction from the axis and the braking body is connected to the follower so that on displacement in the direction away from the axis it can engage a braking member and slowly stop the vehicle.

The use of an eccentric in the manner described above allows the overall length of the brake to be reduced greatly. Furthermore the provision of a step-down transmission operating at a ratio of at least 30:1 further makes it possible to use a relatively small electric motor to drive the unit.

The transmission according to this invention is of the free-running type, that is of the type which transmits force from its input to its output with approximately the same degree of efficiency as from its output to its input. In accordance with the present invention, it is possible to use a planetary-gear transmission as the stepdown transmission, so as to obtain a considerable transmission ratio in a relatively limited space. When the spring pack is closing the brake the drive motor is merely rotated through the transmission in a direction opposite its normal rotation direction when electrically energized to reset the brake.

Furthermore according to this invention, the spring pack is provided after the transmission so that it only need be compressed through the relatively short distance corresponding to the short distance through which the caliper arm is displaced to actuate the brake. This once again gives a reduction in overall size of the assembly compared to the prior art units where the spring pack is provided between the motor and the transmission.

In accordance with further features of the invention the unit may be provided with manual resetting means allowing the brake to be manually open for moving the respective braking member even when the brake is not electrically energized. This can be achieved by means of a manually operable eccentric provided between the main eccentric and the brake. A locking pin or the like can allow resetting of this second eccentric to open the brake for manual operation of the unit.

It is also possible in accordance with this invention to provide an automatic adjusting mechanism which compensates for brakeshoe wear. This type of mechanism may be constituted as a lost-motion coupling in combination with a one-way clutch that operates a worm-gear arrangement that can shorten the link interconnecting the fulcrums of the two arms of the brake caliper. The particular layout of the instant invention allows such a mechanism to be provided relatively easily on the transmission output so that the brake will automatically adjust itself for worn brakeshoes and thereby require minimal servicing.

BRIEF DESCRIPTION OF THE DRAWING

FIG. 9 is a view similar to FIG. 7 showing a third brake in accordance with the instant invention;

FIGS. 12, 13, 14 are sections taken along lines XII—XII, XIII—XIII, XIV—XIV of FIG. 11, respectively; and FIG. 15 is a view similar to FIG. 13 showing an alternative form of a detail of the arrangement of FIG. 11.

SPECIFIC DESCRIPTION

Figure 1:
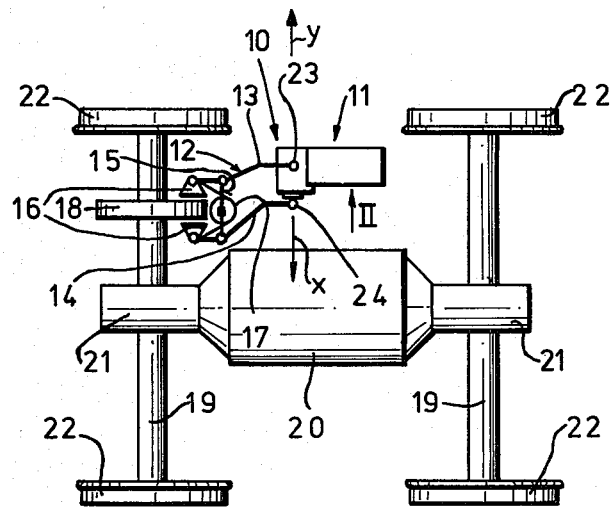
FIG. 1 is a largely schematic top view showing generically the brake according to the instant invention.

As shown in FIG. 1 a brake 10 according to the instant invention basically comprises a drive unit 11 connected to a caliper 12 having a pair of arms 13 and 14 constituted as first-degree levers and interconnected at their centers by means of a link 15 forming fulcrums for the two arms 13 and 14. Each of the arms 13 and 14 carries a brakeshoe 16 and the ends of the arms 13 and 14 farthest from the drive unit 11 are urged apart by means of a hairpin spring 17.

A brake disk 18 lies between the two brakeshoes 16 and is carried on a shaft 19 of a railroad-car bogy or truck that is powered by a central normally electrical motor 20 connected via a pair of stepdown transmissions 21 to two parallel shafts 19. The outer ends of these shafts 19 carry railroad wheels 22 of customary design, and the mechanical connection through the transmission 21 and motor 20 between the two shafts 19 is rigid so that braking of the disk 18 fixed on a front axle 19 will be effective on all four wheels 22.

The one arm 13 is pivoted about an upright axis 23 on the housing of the drive unit 11 and the other arm 14 is pivoted about an upright axis 24 that is displaceable relative to the housing of this drive unit 11. For operation of the brake 10 the drive unit 11 therefore displaces the pivot axis 24 in the direction indicated by arrow x away from the pivot axis 23. As will be described below the drive unit 11 can move limitedly relative to the frame of the vehicle so that displacing the pivot axis 24 in the direction x allows the pivot axis 23 to move in the opposite direction indicated by arrow y. This action moves the two rear ends of the arms 13 and 14 apart, thereby displacing the front ends thereof together and clamping the shoes 16 on the rotating disk 18.

Figure 2:
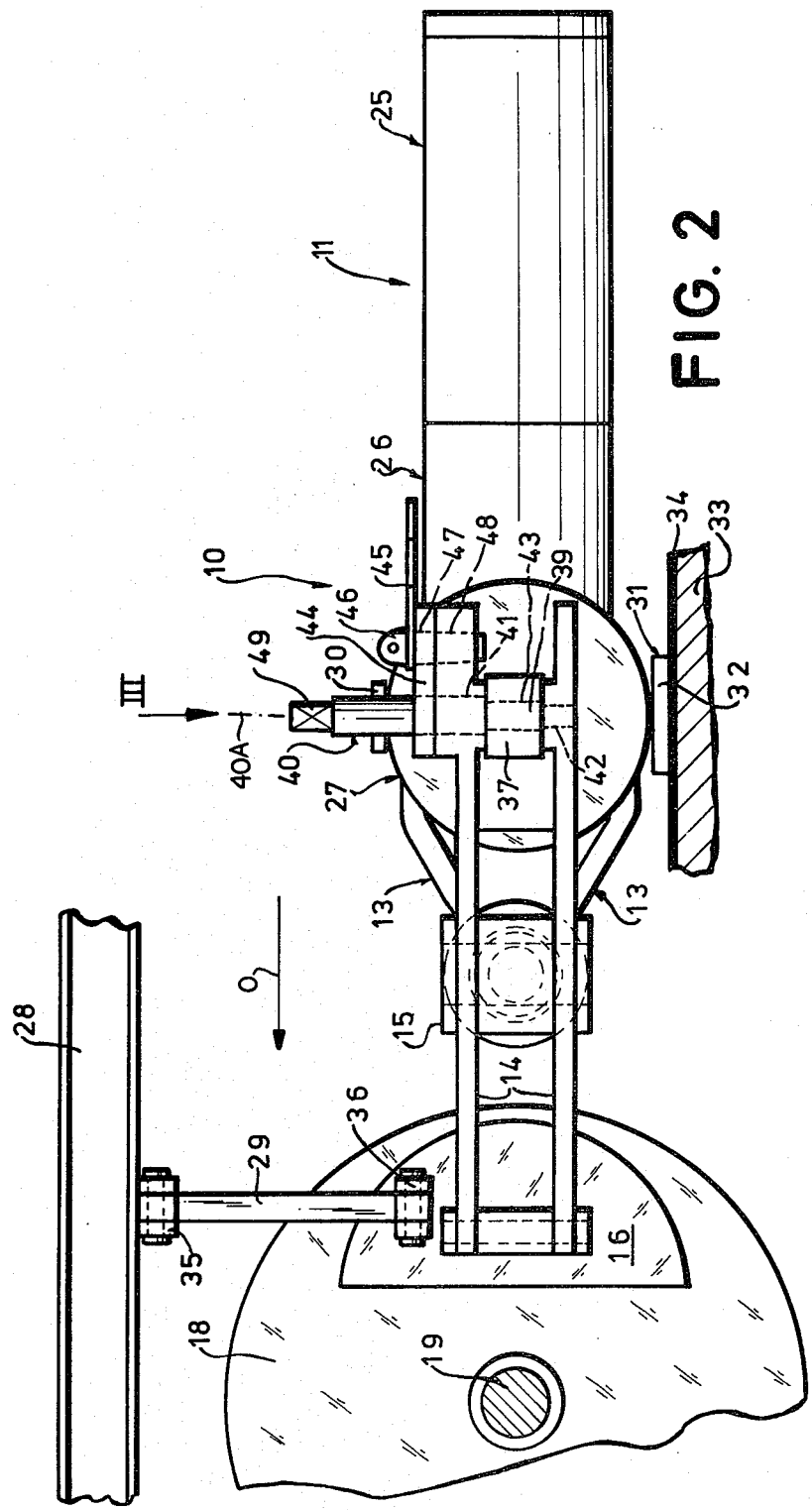
FIG. 2 is a side view taken in the direction of arrow II of FIG. 1 showing a first brake in accordance with this invention in large scale.
Figure 3:
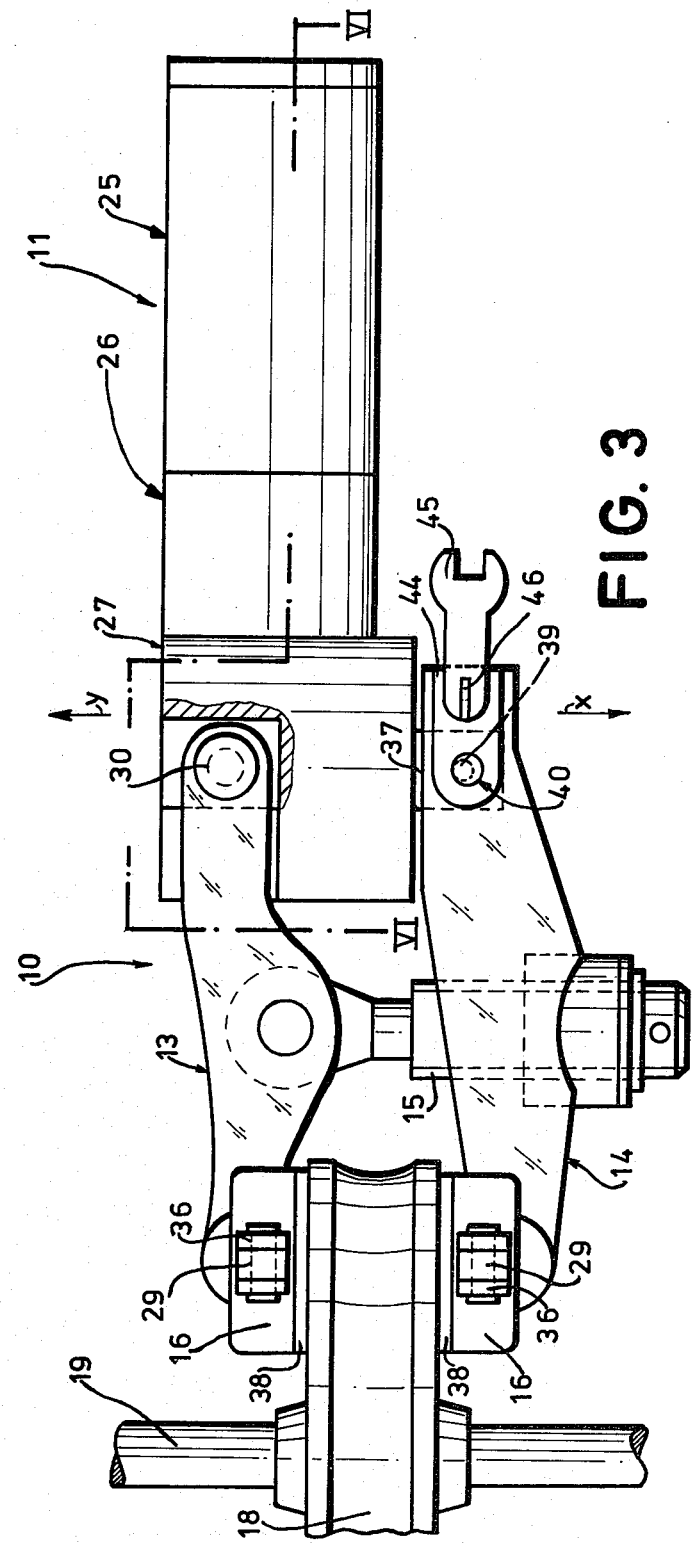
FIG. 3 is a view taken in the direction of arrow III of FIG. 2 showing the first brake according to this invention.

As shown in greater detail in FIGS. 2 and 3 the drive unit 11 is formed by three main subassemblies: a motor unit 25, a stepdown transmission unit 26, and a spring-type force-storage unit 27. The entire drive unit is supported on the railway-car frame 28 for displacement in the directions x and y by a pair of links 29 each pivoted at an upper pivot 35 defining a pivot axis parallel to the travel direction D of the frame and at the lower ends at parallel pivots 36 on the brakeshoes 16. Thus the shoes 16 support the forward end of the brake 10 but the links 29 prevent virtually any displacement of these shoes 16 except in a direction perpendicular to the transit direction D and parallel to the shaft 19. Furthermore the unit 11 is supported in its middle underneath the spring storage unit 27 on a horizontal support plate 33 of the frame 28 which is provided with a coating 34 of low friction material such as Ultramid. The unit 11 bears via an enlarged head 32 of a pivot bolt 31 lying on the pivot axis 23 and constituting the pivot of the lower section of the arm 13. The upper section of this arm 13 is secured by means of another pivot pin 30 secured like the pin 31 via pins and clips against axial displacement on the housing of the spring-force storage unit 27.

A pusher 37 engages the rear end of the arm 14 for displacement thereof in the direction indicated by arrow x to force the brake pads 38 carried on the shoes 16 against the opposite faces of the brake disk 18. As mentioned above displacement of this pusher 37 in the direction x will cause the entire drive unit 11 to move in the direction y for simultaneous clamping of both shoes 16 on opposite faces of this disk 18.

As will be described below the brake 10 is set up so that in case of power failure it will automatically clamp the pads 38 of the shoes 16 on the disk 18. Thus in case of power failure an electric train provided with the brake 10 will automatically stop. This feature is, of course, also effective whenever a car is cut off a train. In case it is desired to move such a car by means of a donkey engine or the like without reconnecting its electric system up so as to pull pads 38 out of contact with the brake disk 18, the present invention provides a manual release mechanism centered on an eccentric portion 39 of a pin 40 journaled in vertically aligned bores 41 and 42 in the upper and lower sections of the arm 14.

Figure 4:
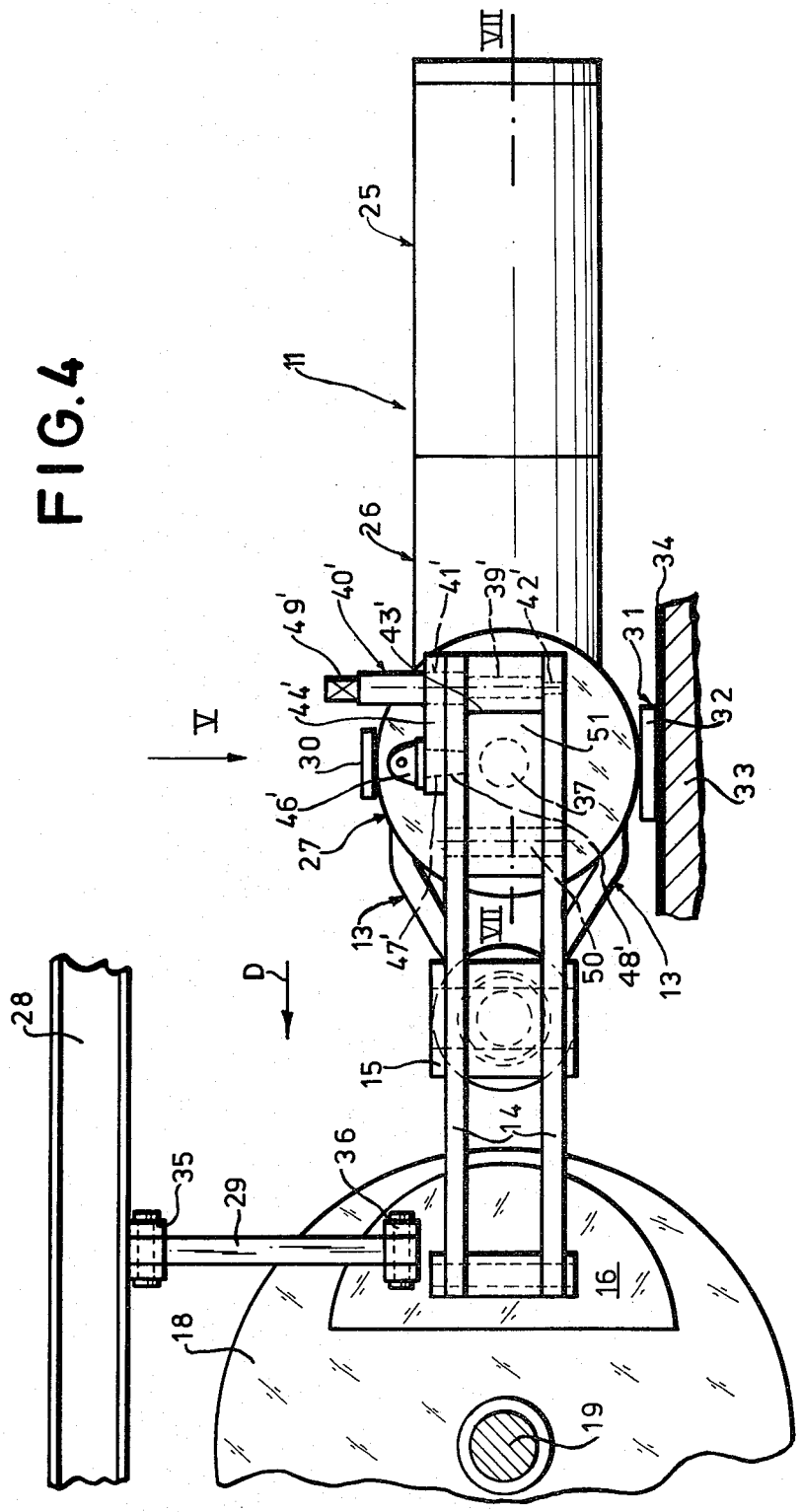
FIG. 4 is a view similar to FIG. 2 showing a second brake according to this invention.

As shown in best detail in FIGS. 3 and 4 this eccentric portion 39 is itself received within a bore 43 of the pusher 37 so that when the pin 40 is rotated about its axis 40A which here extends vertically and perpendicularly to the direction D and to the direction x and y, the arm 14 will be moved limitedly in the directions x or y relative to the drive unit 11. To this end fixed on the pin 40 is a radially and horizontally extending arm 44 secured via a tapered pin 46 of a handle 45 to the arm 14 by engagement of the tapered pin 46 through vertically alignable bores 47 and 48 of the arm 44 and the arm 14. When these bores 47 and 48 are aligned the eccentric 39 is in its position closest to the drive unit 11 so that rotation of this pin 40 through 180° will move the rear end of the arm 14 limitedly toward the drive unit 11 and thereby pull the respective brake pad 38 out of the contact with the disk 18.

This is achieved in accordance with the invention by first pulling the pin 46 out of the bores 47 and 48 and fitting the end of the handle thereof, which is advantageously formed as an open-end wrench, over a square-section upper end 49 of the pin 40. The user need merely rotate this pin 40 through 180° to release the brake even when it is set.

Figure 5:
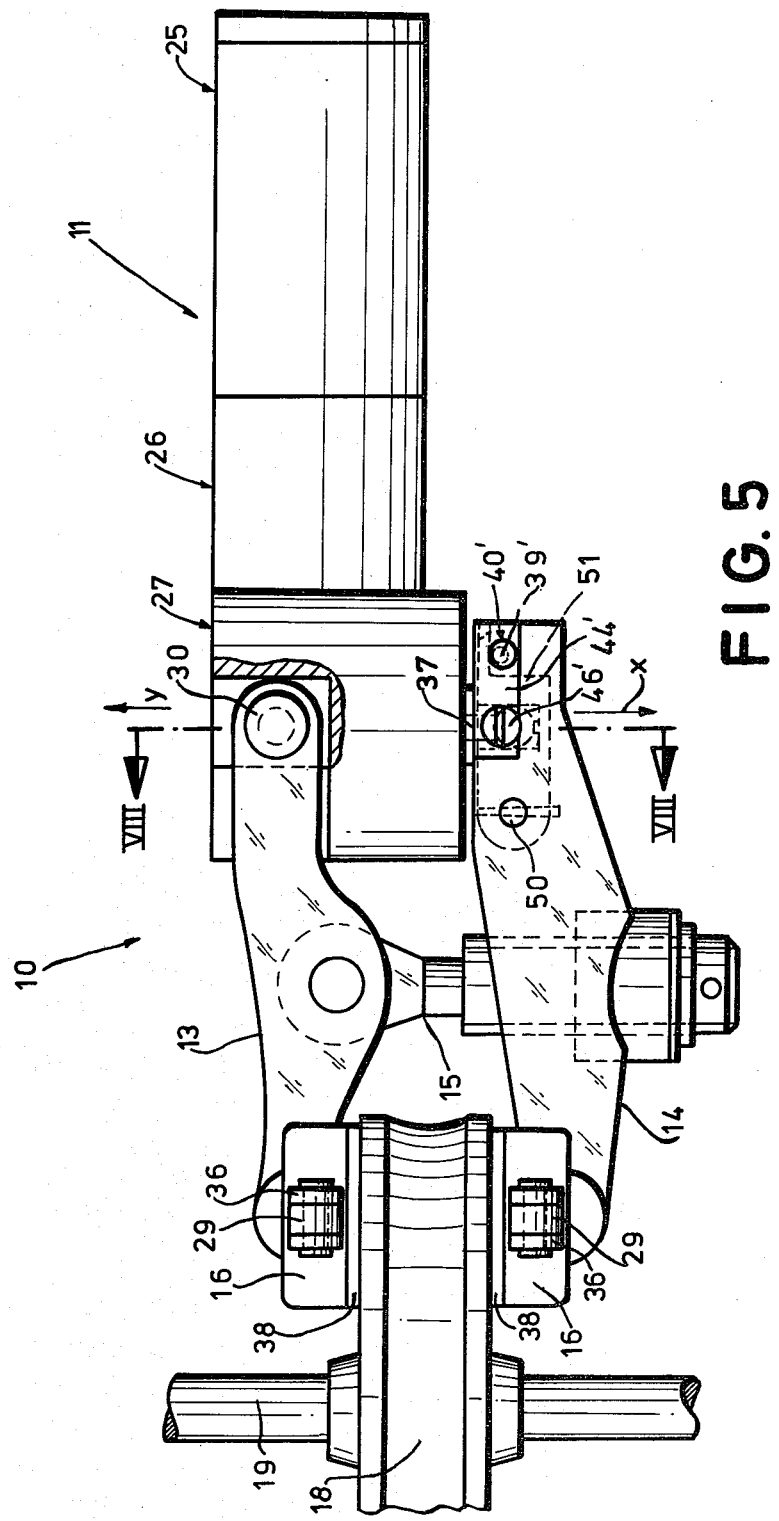
FIG. 5 is a view taken in the direction of arrow V of FIG. 4 of the second brake according to this invention.

FIGS. 4 and 5 correspond essentially to FIGS. 2 and 3 and use identical reference numerals for functionally identical structure. Here, however, the manual release mechanism is different.

In this arrangement the pusher 37 is formed as a ball and engages in a force-receiving block 51 pivoted between the upper and lower sections of the arm 14 on a pin 50 standing vertically between these upper and lower sections of the arm 14 in front of the pusher 37. The rear end of the force-receiving block 51 is formed with a cutout 43' bearing in the direction x on an eccentric portion 39' of a pin 40' journaled in vertically aligned bores 42' in the arm 14. This pin 40' carries and is rotationally fixed to a forwardly extending arm 44' whose angular position can be warped by means of a tapered pin 46' engageable through vertically alignable frustoconical bores 47' and 48' formed in the arm 44' and arm 14. In this arrangement, therefore, the pin 46' must be withdrawn from the bores 47' and 48' and a wrench fitted over the square upper end 49' of the shaft 40' to back off the brakeshoe 38 of the arm 14.

Figure 6:
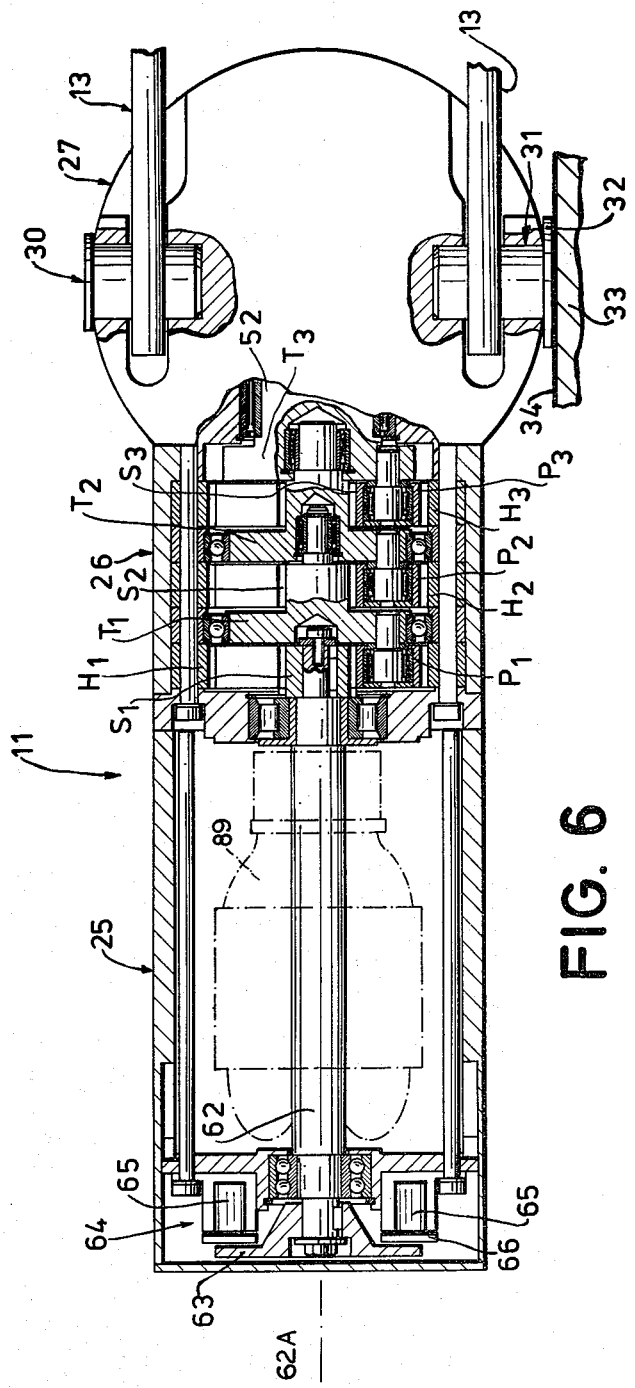
FIG. 6 is a section taken along line VI—VI of FIG. 3 through the first brake according to the present invention.

The drive motor 25 as shown in FIG. 6 is in a direct-current system of the series-wound type with a high starting speed and for alternating-current system is similarly constituted for high starting speed. This motor 25 has a rotor 89 carried on a shaft 62 rotatable about an axis 62A parallel to the direction D. At its forward end this shaft 62 is connected to the transmission 26 here formed as a three-stage planetary-gear stepdown transmission. Thus, the forward end of this shaft 62 is connected to a sun gear $S_1$ meshing with three planetary gears $P_1$ themselves meshing with an outer fixed ring gear $H_1$. These planet gears $P_1$ are in turn carried on a common planet carrier $T_1$ in turn formed with another sun gear $S_2$ meshing with three more planet gears $P_2$ that in turn meshing with a ring gear $H_2$ that is fixed also. Finally the planet carrier $T_2$ of the gears $P_2$ has a sun gear $S_3$ that meshes with three further planet gears $P_3$ that in turn mesh with a fixed ring gear $H_3$. The planet carrier $T_3$ of these gears $P_3$ constitutes the output member 52 of the transmission 26. A 4:1 reduction is achieved at each of the three stages of this transmission 26 so that the input member $S_1$ thereof rotates at a speed sixty-four times faster than the output member 52 constituted by the planet carrier $T_3$. This motor 25 and transmission 26 are usable with all embodiments of the instant invention.

Figure 7:
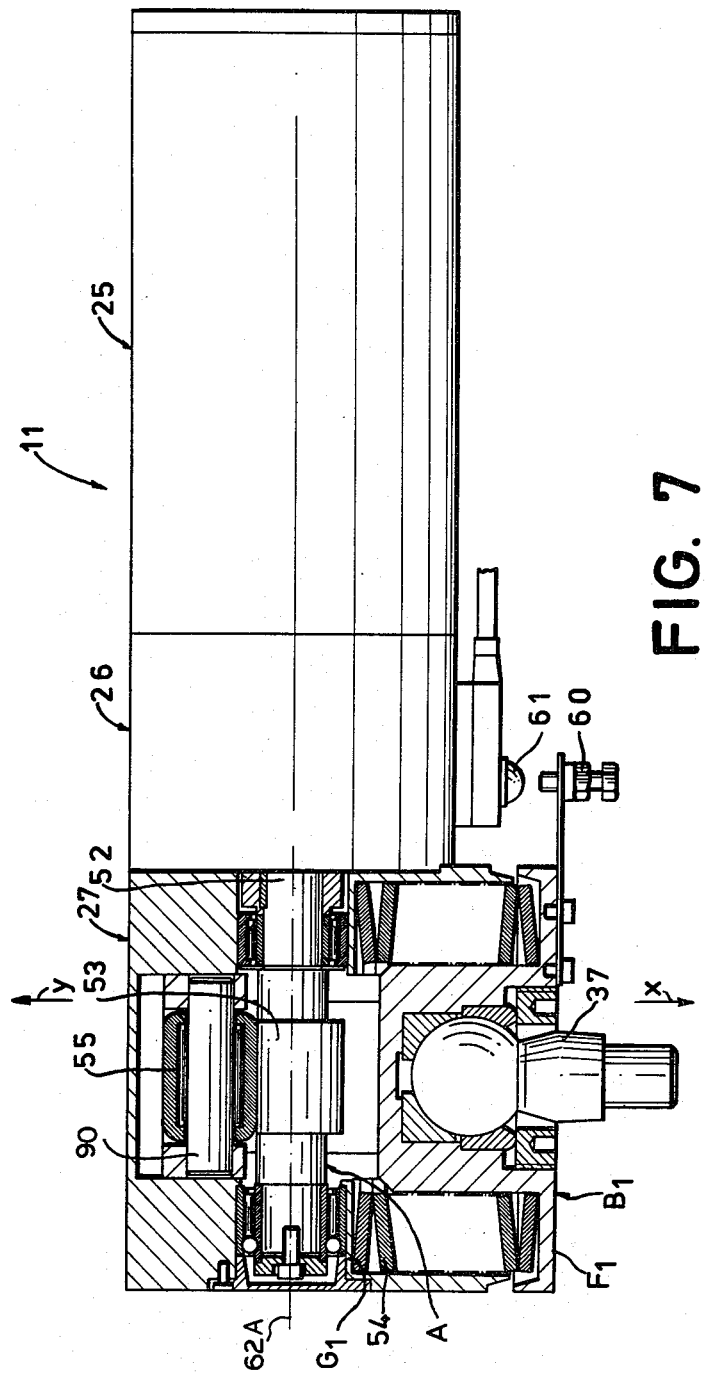
FIGS. 7 and 8 are sections taken along lines VII—VII and VIII—VIII of FIGS. 4 and 5, respectively, through the second brake according to this invention.
Figure 8:
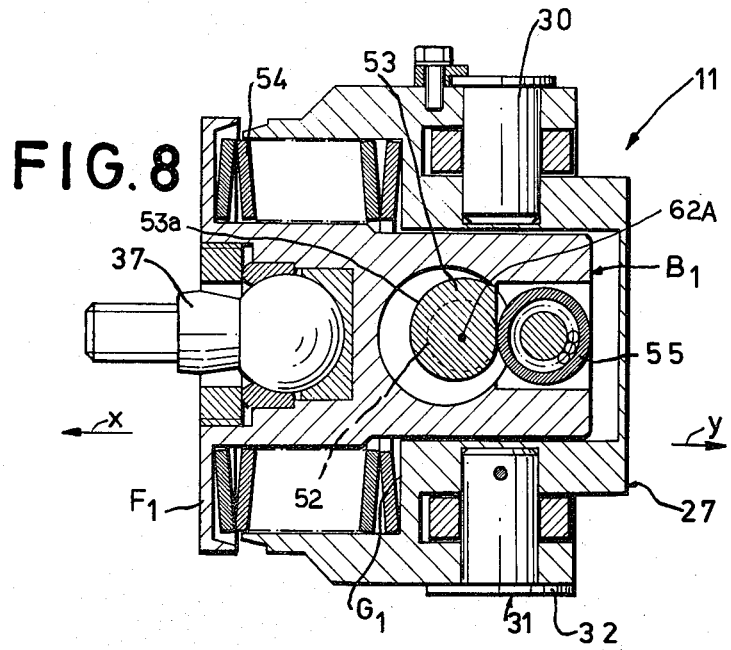

FIGS. 7 and 8 show in detail the spring-storage unit 27 of the embodiment also shown in FIGS. 4 and 5. The output member 52 of the transmission 26 carries an eccentric constituted as a cam 53 whose outer surface 53a extends over an arc of more than 180°, here 270°, as an archimedian spiral. This surface 53a bears radially on a bearing 55 carried on a pin 90 itself journaled in a pusher $B_1$ displaceable in the directions x and y on rotation of cam 53.

A stack of Belleville washers 54 bears at one end in the direction x on a flange $F_1$ of the member $B_1$ and at its other end in the direction y on a surface $G_1$ of the housing of the spring-storage unit 27. This, when the motor 25 operates to rotate its shaft 62 through forty-eight revolutions the cam 53 will rotate counterclockwise as seen in FIG. 8 through 270° and will displace the pusher body $B_1$ carrying the pusher 37 in the direction y, thereby stressing the Belleville washers 54 and storing considerable force in the springs constituted by these washers.

The transmission 26 used here is of the so-called free-running type, that is of a type which transmits force from its input member 62 to its output member 52 and back with approximately the same degree of efficiency in both directions. Thus if the shaft 62 is not positively retained the springs 54 will be able easily to rotate it and simultaneously displace the pusher body $B_1$ in the direction x.

Figure 10:
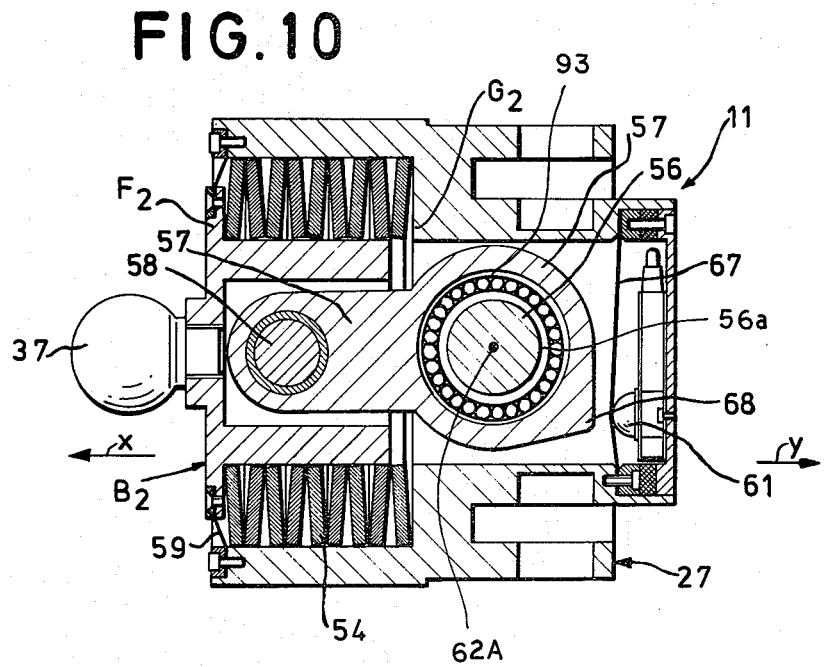
FIG. 10 is a section taken along line X—X of FIG. 9.
Figure 11:
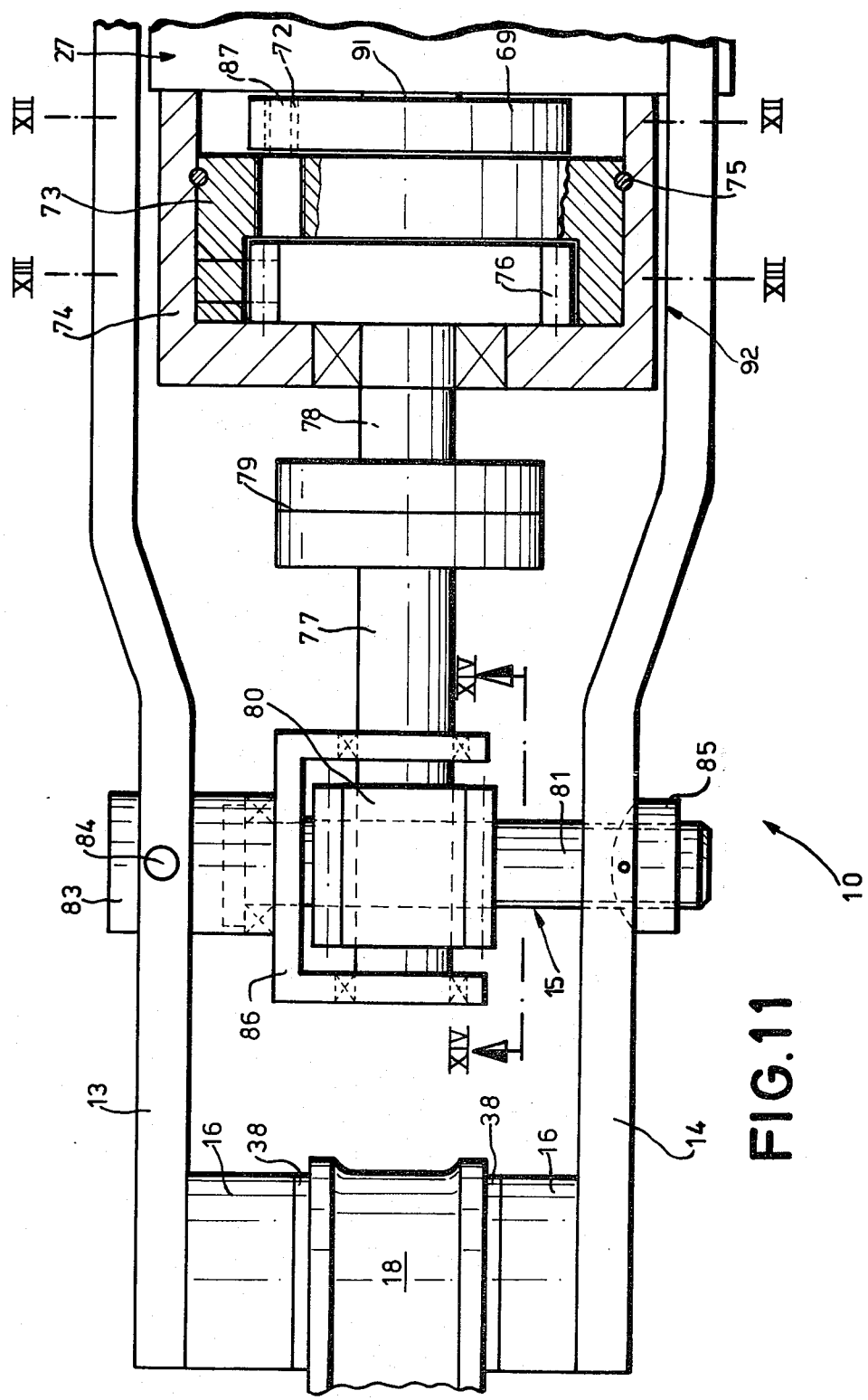
FIG. 11 is a large-scale partly sectional top view through a self-adjusting mechanism usable with a brake in accordance with this invention.

In the arrangement of FIGS. 9 and 10 the output member carries an eccentric cylindrical cam 56 having a cylindrical cam surface 56a whose axial center of curvature is offset from the rotation axis 62A. This cam 56 is received in a bearing 93 in a cylindrical coaxial recess in a pusher member 57 secured by means of a pivot rod 58 and journaled to the pusher body $B_2$ which is substantially identical to the pusher body $B_1$ of FIGS. 6 and 7. A gland 59 is shown here connected between the pusher body $B_2$ and the housing of the spring-force storage unit 27.

Both of the cam systems described above operate in conjunction with a switch 61. In FIGS. 7 and 8 a screw-type abutment 60 acts on the switch 61 when the body $B_1$ is displaced fully to the end of its travel in the direction y, that is after a 270° rotation of the cam 53 about the axis 62A. Actuation of this switch 61 by means of the screw abutment 60 deenergizes the motor 25 and at the same time energizes an electromagnetic brake 64 constituted as a disk 63 fixed to the shaft 62 and carrying a limited axially displaceable ring 66 that is juxtaposed with a stator electromagnet 65. The disk 66 is limitedly axially displaceable relative to the disk 63 but jointly rotatable therewith. Energization of the brake 65, which is simultaneous with the deenergization of the motor 25, therefore locks the shaft 62.

In the arrangement of FIGS. 9 and 10 the pusher body 57 is formed with a switch-actuation bump 68 on its side turned away from the pusher ball 37. The switch 61 is here spaced in the direction y from the axis 62A and is separated from the bump 68 by an elastic and deflectable membrane 67. This switch 61 operates in the same manner as the switch 61 shown in FIG. 7, that is when engaged by the bump 68 it deenergizes the motor 25 and energizes the brake 64.

Of course if electrical power fails, or the railway vehicle having the brake 10 is disconnected, both the motor 25 and brake 64 will become deenergized. This will allow the shaft 62 to rotate so that the springs 54 will move the pusher 37 in the direction x and apply the shoes 38 to the brake disk 18. Due to the 64:1 ratio between the input and output sides of the transmission 26 a relatively light electromagnetic brake 64 can serve to hold the springs 54 in the compressed condition.

Any of the brakes described above can be equipped according to the instant invention with a self-adjusting mechanism such as shown in FIGS. 11–14. This is achieved by removing the cover plate 90 shown in FIG. 9 and securing a short extension 91 to the end of the output shaft 52 opposite the motor 25. This extension 91 carries a plate 69 formed with an arcuate slot 72 having a pair of ends 70 and 71 and extending over slightly less than 180°. It is noted in this context that the maximum travel of the pusher body 57 shown in FIG. 9 is achieved through 180° rotation of the cam 56 and the switch 61 of FIG. 9 is positioned to only allow the shaft 52 to rotate through 180°.

Axially engaged in this arcuate slot 72 is an entrainment cam 87 projecting from the outer part 73 of a one-way clutch 92. An O-ring secures the outer members 73 of this clutch in a housing part 74 so that it can only be rotated intentionally, that is vibration alone will not displace it angularly. The inner member 76 of this one-way clutch is connected via a shaft stub 78 through a flange coupling 79 to another shaft stub 77 journaled in a yoke 86 and carrying a worm gear 80. The one-way clutch 92 may be of the radially displaceable spring type shown in FIG. 13 or of the ball type shown in FIG. 15.

The link 15 is here formed by a worm shaft 81 rotatable at one end in a support block 83 secured by means of a vertical pivot 84 in the arm 13 and threaded at the other end in a nut 85 also pivotal about a vertical axis but on the arm 14. The holder 83 carries the yoke 86 in which the shaft 77 carrying the worm 80 is journaled. At its center the threaded shaft 81 carries a worm gear 82 seen in FIG. 14 which meshes with the worm 80.

The arc length of this slot 72 is slightly less than 180°. Under normal operating circumstances as the brake is actuated the shaft 91 will rotate through approximately 180°, thereby causing the plate 69 to turn about the axis 62A and thereby bring the pin 87 from adjacent one end 70 of the slot 72 to adjacent the other end 71.

When, however, the brakeshoes 38 have worn considerably the shaft 91 will be pivoted through the full 180° travel thereby bringing the pin 87 into engagement with the end 71 of the slot 72. This will rotate the outer member 73 of the clutch 92 relative to the inner member 76 thereof. When the brake is disconnected by operation of the motor 25 to retract the shoes 38 the pin 87 will move back through 180° and will therefore come into contact with the opposite end 70 of the slot 72. In this direction the clutch 92 will couple together the parts 73 and 76 and the worm 80 will be rotated in a direction that screws the rod 81 so as to shorten the overall length between the pivots of the elements 83 and 85 of the link 15. The play between each of the shoes 38 and the corresponding face of the disk 18 will, therefore, automatically be compensated for.

It is noted that in the above arrangement the particularly advantageous orientation of the axis 62A relative to the disk 18 and the various axes of the caliper 12 allows the system according to the instant invention to operate in an extremely efficient manner. At the same time the system is very compact.

I claim:

1. A brake comprising:
   a drive motor having a rotary motor output;
   a free-running transmission having a rotary transmission input connected to said motor output and a rotary transmission output, said transmission operating at a relatively high transmission ratio such that said transmission input rotates at a speed many times greater than said transmission output;
   an eccentric mounted on said transmission output for rotation therewith about the axis thereof;
   a follower operatively radially engageable with said eccentric and radially displaceable thereby in a predetermined radial direction on rotation of said eccentric about said axis;
   an abutment spaced a fixed distance in said direction from said axis;
   at least one spring operatively engaged between said abutment and said follower and compressible thereby;
   a braking member displaceable transverse to said direction adjacent said follower; and
   a braking body connected to said follower and engageable in said direction with said member on radial displacement of said follower in said direction away from said axis.

2. The brake defined in claim 1 wherein said spring is displaceable between a compressed condition and a relatively decompressed condition, said braking body being displaceable between a braking position corresponding to said decompressed condition of said spring and engaging said braking member and a nonbraking position corresponding to said compressed condition of said spring and out of engagement with said braking member.

3. The brake defined in claim 2 wherein said eccentric is a cam having an arcuate outer surface of nonuniform radial spacing from said axis engageable with said follower.

4. The brake defined in claim 3 wherein said cam is displaceable angularly of said axis through between about 180° and 270° for displacement of said follower between a pair of end positions respectively corresponding to said compressed and decompressed conditions of said spring.

5. The brake defined in claim 4 wherein said follower includes a roller radially bearing on said surface of said cam.

6. The brake defined in claim 2 wherein said eccentric is a cam having a substantially cylindrical outer surface centered on an eccentric axis offset from said axis of said output.

7. The brake defined in claim 6 wherein said cam is displaceable angularly of said axis of said output through at most 180° for displacement of said follower between a pair of end positions respectively corresponding to said compressed and decompressed conditions of said spring.

8. The brake defined in claim 7, further comprising control means connected to said motor and cooperating with said follower for deenergizing said motor on displacement of said follower into said end position corresponding to said compressed condition of said spring.

9. The brake defined in claim 8 wherein said control means includes a switch connected to said motor and operable by said follower.

10. The brake defined in claim 2 wherein said transmission is a gear transmission.

11. The brake defined in claim 10 wherein said transmission is a planetary-gear transmission.

12. The brake defined in claim 11 wherein said ratio is at least 30:1.

13. The brake defined in claim 2 wherein said input and output of said transmission are coaxial with each other and with said output of said motor.

14. The brake defined in claim 2, further comprising a caliper having a pair of arms embracing said braking member, one of said arms constituting said braking body, said transmission, motor, and spring being suspended from said caliper.

15. The brake defined in claim 2, further comprising:
    a caliper having a pair of arms each having a front end one of which constitutes said braking body and a rear end, said follower operatively engaging said rear end of said one arm;
    a link extending between said one arm intermediate said ends thereof and the other intermediate said ends thereof;
    a pivot for the rear end of said other arm, whereby displacement of said rear end of said one arm relative to said rear end of said other arm closes said front ends on said braking member;
    means for varying the length of said link between said arms; and
    means connected to said eccentric for decreasing said length when the travel of said braking bolt between said braking and nonbraking positions exceeds a predetermined limit.

16. The braking defined in claim 15 wherein said means for varying said length includes a first threaded element threadedly engaging said first element and engaging the other of said arms, and means for relatively rotating said first and second elements.

17. The brake defined in claim 16 wherein said means connected to said eccentric includes a lost-motion coupling, said means for relatively rotating including a wormgear assembly connected between said first and second element and said lost-motion coupling.

18. The brake defined in claim 17 wherein said means connected to said eccentric further comprises a one-way clutch between said wormgear assembly and said eccentric.

19. The brake defined in claim 18 wherein said link extends transversely of said axis.

20. The brake defined in claim 2, further comprising a rigid support link having a lower end pivoted on said braking body about an axis generally parallel to said axis of said output and an upper end pivoted on the frame of a vehicle provided with said brake about an axis generally parallel to said axis.

21. The brake defined in claim 2, further comprising an electric brake energizable to arrest said motor output.

22. The brake defined in claim 1, further comprising means between said follower and said body for manually displacing said body limitedly relatively to said follower.

23. The brake defined in claim 22 wherein said means between said follower and said body is a bolt having an eccentric part.

24. The brake defined in claim 23 wherein said bolt is operatively engaged with said braking member and said eccentric part is operatively engaged with said follower, said means further comprising releasable means for locking said bolt angularly in place.

* * * * *